D. W. JACOBY.

Seed-Dropper.

No. 68,443.

Patented Sept. 3. 1867.

Witnesses:

G. W. Rhoads
I. J. Mouser

Inventor:

D. W. Jacoby

United States Patent Office.

D. W. JACOBY, OF SHELBYVILLE, ILLINOIS.

Letters Patent No. 68,443, dated September 3, 1867.

---

IMPROVEMENT IN CORN-PLANTERS.

---

The Schedule referred to in these Letters Patent and making part of the same.

---

TO ALL WHOM IT MAY CONCERN:

Be it known that I, D. W. JACOBY, of Shelbyville, Shelby county, Illinois, have invented a new and improved Corn-Planter; and I do hereby declare that the following is a full and exact description thereof, reference being had to the accompanying drawings, and to the letters of reference marked thereon.

The nature of my invention consists in providing a dropping apparatus to a corn-planter that cannot cut the grains, that is easily worked, and that can be regulated to drop any desired number of grains without taking the corn out of the hopper, the same being regulated by a thumb-screw on the outside of the hopper.

To enable others to make and use my invention, I will proceed to describe its construction and operation.

Figure 1:
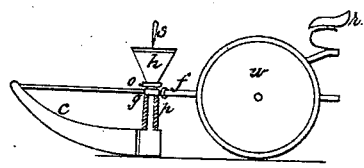

My invention can be applied to any corn-planter; but for convenience I will describe what is usually called a double check-row corn-planter, which is constructed with a tongue, at the end of which is a cross-piece, to which are attached the cutters $c$, Figure 1, having hollow tubes $p$ to conduct the corn from the dropper to the ground. The cutters are connected and held in position by a cross-piece, $g$, on top of the tubes $p$. On the top of this I bolt my dropping apparatus $o$, on the top of which is put a hopper, $h$. The droppers are connected by an iron rod, to which is attached a lever, S, by which the droppers are agitated at will. To the rear of the above described is attached a frame, with a hinge at $f$, to which is bolted an axle with wheels, $w$, which serve as coverers. Between the wheels is placed a seat, $r$, for the driver. What I claim I show by figs. 2, 3, 4, and 5.

Figure 2:
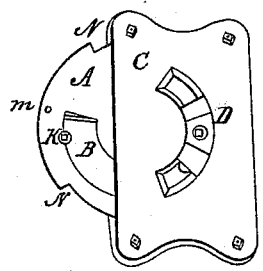

Figure 2 shows the dropper bolted together, showing the circular metallic plate A, the semicircular ring B, the thumb-screw K to fasten ring B, the bolt-hole $m$, to which the lever-rod is bolted, the stops N N. The top-plate C is shown with the cut-off D attached.

Figure 3:
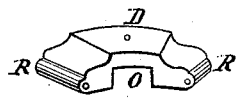

Figure 3 shows the metallic cut-off, being of a semicircular shape, as shown in fig. 2. On the under side is cut a notch or groove, O, to fit over the top plate, as shown at E, fig. 5, the ends passing down through openings, as shown at $a$, fig. 5, till the rollers R R, which are attached to the cut-off D, fig. 3, roll on the top of the circular plate A. The rolllers R R, fig. 3, are attached to the end of the cut-off D, immediately over the holes in plate A, and revolve when the corn is drawn under by the plate A, and thereby prevent the corn from being cut. The cut-off D is secured to the top plate C by a bolt in the centre, with a spring of rubber or other suitable material under the nut to give freedom of motion to the cut-off, if necessary.

Figure 4:
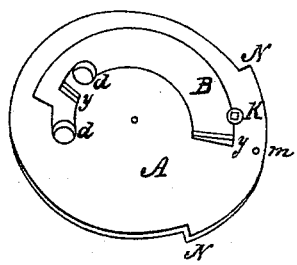

Figure 4 shows the circular wheel A, which is partially described under fig. 2. B shows the semicircular ring, so arranged that, in combination with plate A, it forms the holes $d\ d$, which can be set to any desired size by loosening the screw K and withdrawing the ring B, which remains in position by tightening the screw K. $y\ y$ are openings to allow the ring B to move back and forth as desired.

Figure 5:
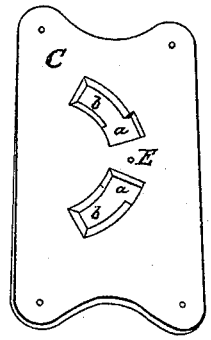

Figure 5 shows the top plate C, with the openings $a\ a$ for the cut-off, the openings $b\ b$ for the corn to pass through to the wheel A. At E is shown the bolt-hole for the attachment of the cut-off D.

*Claim.*

What I claim as my invention, and desire to secure by Letters Patent, is—

1. The metallic cut-off, with the rollers R R, to prevent the cutting of corn, substantially as described.

2. The manner of regulating the size of the hole in dropping-plate by a semicircular ring in the circular plate, in the manner as described.

3. The combination of the cut-off D with the rollers R R, the top plate C, and the semicircular ring B in the circular plate A, substantially as described and for the purpose set forth.

D. W. JACOBY.

Witnesses:
G. W. RHOADS,
I. J. MUSER.